United States Patent [19]

Inoue

[11] 4,288,675
[45] Sep. 8, 1981

[54] CUTTING AREA RESPONSIVE EDM METHOD AND APPARATUS WITH CYCLICALLY INTERRUPTED PULSE TRAINS

[75] Inventor: Kiyoshi Inoue, Tokyo, Japan

[73] Assignee: Inoue-Japax Research Incorporated, Yokohama, Japan

[21] Appl. No.: 18,637

[22] Filed: Mar. 8, 1979

[30] Foreign Application Priority Data

Mar. 9, 1978 [JP] Japan .................................. 53-26822
Sep. 6, 1978 [JP] Japan ................................ 53-109493
Sep. 12, 1978 [JP] Japan ................................ 53-111986

[51] Int. Cl.³ ............................................... B23P 1/02
[52] U.S. Cl. ............................... 219/69 M; 219/69 P; 219/69 C
[58] Field of Search ................ 219/69 G, 69 P, 69 M, 219/69 C

[56] References Cited

U.S. PATENT DOCUMENTS 3,536,881 10/1970 Inoue ................................. 219/69 G
3,558,842 1/1971 Livshits et al. .................... 219/69 P
3,943,321 3/1976 Pfau et al. .......................... 219/69 P Primary Examiner—C. C. Shaw
Attorney, Agent, or Firm—Karl F. Ross

[57] ABSTRACT

EDM method and apparatus in which the electrical-discharge machining pulses are triggered by the application across the machining gap of a succession of pulse trains of discrete pulses whose durations and intervals may be preset for optimum machining conditions (e.g. surface finish). The instantaneous machining area is detected and a time element, such as the duration of each pulse train or the interval between pulse trains or both, is controlled so as to maintain the current density substantially constant in spite of changing machining areas during the machining process.

15 Claims, 7 Drawing Figures

CUTTING AREA RESPONSIVE EDM METHOD AND APPARATUS WITH CYCLICALLY INTERRUPTED PULSE TRAINS

FIELD OF THE INVENTION

The present invention relates to electrical discharge machining (EDM). In particular, it relates to a method of and an apparatus for electrical-discharge-machining a workpiece with a tool electrode across a dielectric-filled machining gap with machining surfaces whose active area changes as the tool electrode is advanced relatively toward the workpiece with the progress of material removal or machining. The invention is applicable to various modes of EDM operation including boring, cavity-sinking or three-dimensional cutting, traveling-wire (TW) or wire-cut (WC) EDM and numerous other particular operations.

BACKGROUND OF THE INVENTION

In electrical discharge machining, electric energy is applied in the form of discrete electrical pulses across the machining gap filled with a machining fluid or liquid dielectric (e.g., kerosine, transformer oil, distilled water) to effect a succession of electrical discharges between the tool electrode and the workpiece to remove material from the latter. As material removal proceeds, the tool electrode is advanced relatively toward the workpiece by servo feed means adapted to maintain the machining gap spacing substantially constant thereby to allow material-removal discharges to be successively created. The contamination of the machining gap region with chips, tar and gases produced by machining discharges may be clarified by continuously or intermittently flushing the fresh machining fluid into the gap and/or intermittently or cyclically retracting the tool electrode away from the workpiece to allow the fresh machining medium to be pumped into the machining gap and the machining contaminants to be carried away from the latter.

Parameters of individual and successive electrical discharges, i.e. pulse on-time $\tau on$, peak current $Ip$ and off-time $\tau off$, are determinative of machining results, e.g. removal rate, surface roughness and relative electrode wear, and therefore are individually and in combination particularly adjusted to establish a particular machining condition suitable to achieve desired machining results.

As pointed out in U.S. Pat. No. 3,536,881 issued Oct. 27, 1970 to Kiyoshi Inoue, one of the problems arising in electrical discharge machining is the problem of changing current density as the working face of the tool electrode is juxtaposed with larger or smaller surface areas of the workpiece whereby discharges must occur over changing surface areas. Thus, a given total current resulting from uniform application of successive discharges will provide diminished current density as the working area increases and vica versa. With the machining gap maintained constant, for example, changes in the working surface area vary the current density with reduced performance even when various measures such as gap short-circuit and arc prevention are made in an attempt to hold the machining gap under an optimum machining condition. These particular deficiencies and inconveniences are overcome, as disclosed in the above-quoted patent, by maintaining the current density substantially constant by providing a current-control circuit responsive to the rate of the tool electrode with a gap-controlling servo for compensatorily varying the current. This is based upon the fact that, when the position of the tool electrode is adjusted by a servo-mechanism or servo feed means to maintain a substantially constant optimum machining gap, the rate of change of the feed with time is a function of the change in surface area exposed to electrical discharges along the machining surface. Consequently, a reduced surface area is equivalent to a higher removal rate and a correspondingly higher electrode feed rate, while an increased machining area is equivalent to a lower rate of material removal and a corresponding decrease in the rate of advance of the electrode.

Consequently, the aforesaid patent makes provision of sensing means responsive to the rate of advance of the electrode for indicating the variation in surface area exposed to the machining operation and mean-current control means in the power supply circuit electronically regulated in any of various manners by the rate sensing means. Specifically, as described therein, the mean-current control means may include a source of direct-current which is switched on and off to provide a train of discharge pulses whose parameters are modified to maintain the current density substantially constant, in response to change in machining area, by: (a) varying the on-time $\tau on$ of the pulses of the pulse train while maintaining the pulse frequency f substantially constant; (b) varying the off-time $\tau off$ of the train while maintaining the pulse frequency f substantially constant; (c) varying the on-time $\tau on$ of the pulses of the train while maintaining the off-time $\tau off$ of the pulses constant; or (d) varying the off-time $\tau off$ of the pulses of the train while maintaining the on-time $\tau on$ of the pulses constant.

The modification of individual pulse parameters has, however, been found to be disadvantageous in that preset machining conditions such as relative electrode wear are adversely affected and the machining operation becomes unstable. Hence, the earlier measures enunciated in the aforementioned U.S. Patent are of limited value in putting the concept into practice and are practically inconvenient.

OBJECTS OF THE INVENTION

It is, accordingly, an object of the present invention to provide an improved method for carrying out EDM at an optimum rate independent of variation in the machining area without substantially changing preset machining conditions and with continued stability of operation in spite of change in the surface area.

Another object of the present invention is to provide an improved EDM apparatus whereby change in the machining surface area is effectively compensated for while avoiding fluctuation of basic pulse parameters so that a given machining operation is carried out at stability and to achieve desired machining results.

SUMMARY OF THE INVENTION

In accordance with the present invention, there is provided a method of electrical-discharge-machining a workpiece juxtaposed with a tool electrode across a dielectric-filled machining gap with machining surfaces of variable machining area as the tool electrode is advanced relatively toward the workpiece so as to maintain the gap spacing therebetween substantially constant, the method comprising the step of: applying across the machining gap pulse trains individually consisting of elementary pulses of predetermined on-time τon and off-time τoff and having a duration Ton with the successive trains being separated by a cut-off time interval Toff; detecting the rate of advance of the electrode relative to the workpiece during application of the pulse trains; varying the duration Ton or the cut-off time interval Toff or both in accordance with the detected rate of relative advance movement of the tool electrode so as to maintain the current density along the machining surfaces substantially constant in spite of change in the machining area during relative advance movement of the tool electrode.

An apparatus according to the invention comprises: power supply means for applying across the machining gap pulse trains individually consisting of elementary pulses of predetermined on-time τon and off-time τoff and having a duration Ton with the successive trains being separated by a cut-off time interval Toff; servo feed means connected with one of the tool electrode and the workpiece electrode for advancing the same relatively toward the other so as to maintain the gap spacing therebetween substantially constant; circuit means responsive to the rate of relative advance movement of the electrodes for producing an output representative of change in area of the machining gap during application of the pulse trains; and control means responsive to the output for varying either the duration Ton or the cut-off time interval Toff or both so as to maintain the current density along the machining surfaces substantially constant in spite of changes in the machining area during relative advance movement of the electrodes.

At this point, it should be noted that the term "current density" is used throughout this specification and the appended claims to refer to "mean current divided by machining area over which discharges are occurring".

The machining area over which discharges are occurring per unit time may be ascertained by dividing the number of "satisfactory" discharges occurring per unit time by the rate of relative advance movement of the electrodes under the assumption that each "satisfactory" discharge results in an identical amount of stock removal, using the relation that the machining area equals removal rate divided by distance traveled by the electrode per unit time, and an output signal derived by the division may be used to control a first time element in the form of the duration Ton of the individual pulse trains, a second time element in the form of the cut-off time interval Toff between the successive trains, or both to achieve the end described.

Where the electrode has a relative simple configuration and its active machining face comprises a plurality of surfaces stepped in the feed direction with each extending perpendicular thereto, the feed positions at which the machining surface changes from one area to the other can be ascertained to provide a corresponding switch-over signal to change the controllable magnitude (Ton and/or Toff) from one preset value and the other to achieve the end described.

Broadly stated, therefore, the method embodying the principles of the invention may include the detection step of detecting change in the machining area over which machining discharges are occuring and the control step of controlling at least one of the duration Ton and the interval Toff in accordance with the detected change in the machining area. Likewise, an apparatus including means for performing these particular steps may be provided.

BRIEF DESCRIPTION OF DRAWING

These and other features and advantages of the present invention will become more readily apparent from the following description of certain exemplary embodiments thereof with reference to the accompanying in which.

SPECIFIC DESCRIPTION

Figure 1:
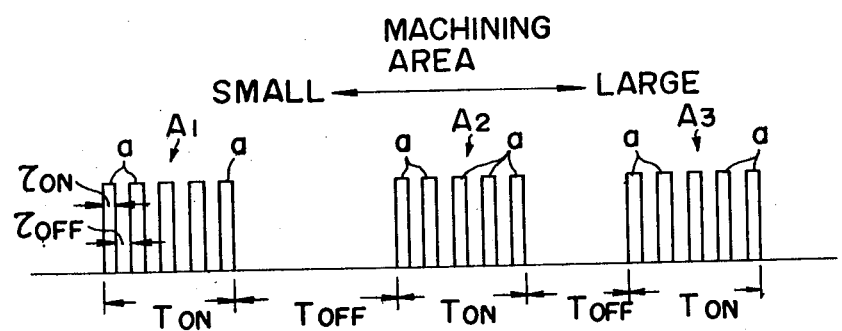
FIG. 1 is a waveform diagram illustrating pulse trains utilized in the present invention with train interval varied in accordance with the principles thereof.

In FIG. 1 there is shown a succession of pulse trains A1, A2, A3 employed in accordance with the invention. Pulse trains A1, A2, A3 individually consist of elementary pulses a of predetermined on-time τon and off-time τoff and have a duration Ton with the successive trains being separated by a cut-off time interval Toff. The on-time τon and off-time τoff of elementary pulses are usually selected in the range between 1 and 100 μsec primarily according to the electrode materials or combination although wider ranges may also be used. Thus, the on-time τon and off-time τoff may range between 1 μsec and 3 m sec and between 3 and 200 μsec, respectively, and each range may be divided into subranges depending upon the degree of surface roughness desired.

In accordance with the present invention, the successive pulse trains are modified with regard to the duration Ton and/or cut-off time interval Toff in response to change in the machining area so as to maintain the current density along the machining area substantially constant. In the illustrated diagram, the cut-off time Toff is shown to be varied as the machining area varies with Ton held constant within which a fixed number of elementary pulses a occur of predetermined on-time τon and off-time τoff. In order to allow the current density to be constant, hence with the tendency to make the electrode feed rate constant, the variation of duration Ton and interval Toff is such that as the machining area increases, Ton is increased and Toff is reduced and vice versa. The duration Ton and interval Toff may each range between 200 μsec and 5 msec and be variable in this range.

The variation of Toff and especially that alone is particularly advantageous in that preset machining conditions are substantially not affected at all. For example, it has been found in the course of the invention that relative electrode wear η (tool electrode wear divided by stock removal from workpiece) is expressed by:

$$\eta = \beta(\tau on/\tau off)^{-\frac{1}{2}} Ton^{-\frac{1}{2}} f(Ip)$$

where $\beta$is are constants. This expression shows that earlier attempts to increase the pulse interval $\tau$off between successive discharge pulses lead to deterioration of the electrode wear which is invariable with increase of the pulse train interval Toff with fixed values of duration Ton and pulse peak current Ip.

Figure 2:
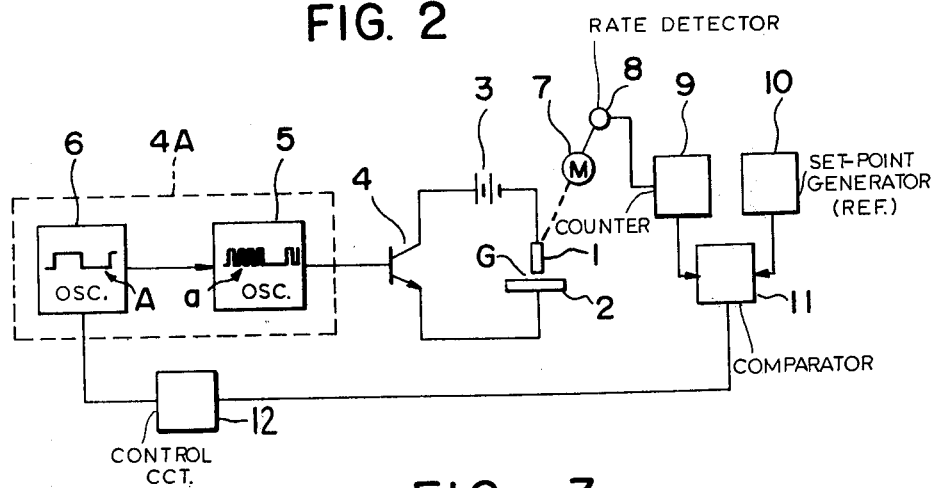
FIG. 2 is a diagrammatic representation illustrating a basic system embodying the present invention.

In FIG. 2 there is shown an automatic detection and control system embodying the present invention whereby the duration Ton and/or cut-off time interval Toff are varied in response to changes in the rate of advance of a tool electrode 1 toward a workpiece 2 in an EDM machine. The tool electrode 1 and the workpiece 2 are juxtaposed with one another to form a machining gap G therebetween which is supplied with a machining fluid. A DC power supply 3 is connected to the electrode 1 and the workpiece 2 via switching means 4, shown as a power transistor, which is turned on and off by a switching network 4A to alternately connect and disconnect the output of the DC source 3 across the machining gap G.

The switching network 4A comprises a first oscillator 5 operating at a frequency f to provide switching pulses of predetermined on-time $\tau$on and off-time $\tau$off which are applied to the power switch 4 and a second oscillator 6 operating at a frequency F which is higher than the frequency f of the oscillator 5 to provide control pulses of duration Ton and interval Toff which are applied to the oscillator 5. Accordingly, the switch 4 is operated to turn on and off the DC source 3 and provide across the machining gap G pulse trains A individually consisting of elementary pulses a of predetermined on-time $\tau$on and off-time $\tau$off and having duration Ton with the successive trains A being separated by cut-off time interval Toff (FIG. 1) with the regulated peak current Ip determined by the output of supply 3. Each of the first oscillator 5 and the second oscillator 6 may be an astable or other form of multivibrator having a time-constant or pulse-defining network in a configuration well known in the pulse switching and shaping art to provide predetermined, adjustably variable pulse on-time or duration and pulse off-time or interval, $\tau$on, $\tau$off in the oscillator 5 and Ton, Toff in the oscillator 6.

Servo feed means is shown comprising a motor 7, which is preferably a pulse motor but may be a DC motor or any other drive means including a hydraulic drive, connected with the tool electrode 1 to advance the same toward the workpiece 2 as EDM proceeds in the machining gap G so as to maintain the gap spacing constant. To the motor 7 where is coupled an encoder 8 which is designed to detect the rate of advance of the tool electrode 1 and to provide pulses proportional in number to the rotation of the motor 7 or a pulse for each incremental distance the electrode 1 is advanced. Tool-advanced responsive pulses generated at the encoder 8 are counted by an integrating counter 9 which provides a signal representative of the electrode feed displacment per unit time which is applied to the first input of a comparator circuit 11. The counter 9 is preferably a reversible counter so that signal pulses corresponding to any backward displacement of the tool 1 may be subtracted from the counts accumulated in the counter 9. In an EDM operation, the tool electrode 1 may be back-moved or retracted in response to the servo signal which indicates a gap excessive narrowing, short-circuiting or abnormality and it is also customary to provide an intermittent retraction of the tool electrode 1 to renew the gap G with the machining medium for cyclic gap decontamination.

The second input of the comparator circuit 11 is supplied with a preset reference signal from a setting circuit 10. The comparator circuit 11 thus provides a comparison of the electrode advance signal for unit time with the reference value to issue an output signal representating change in the machining area of the electrode 1 juxtaposed with the workpiece 2. A plurality of reference values are desirably preset at the setting circuit 10 and applied to the comparator circuit 11 so that for every stepwise change in the machining area ascertained, an output signal is provided by the comparator circuit 11.

Figure 3:
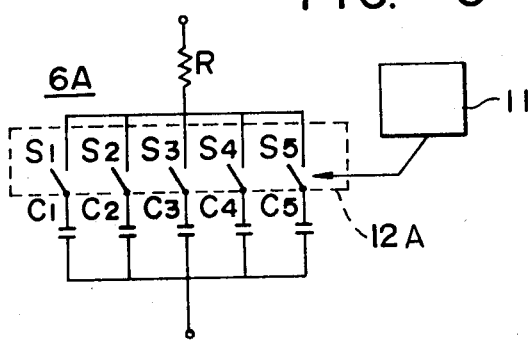
FIG. 3 is a circuit diagram illustrating the control portion of an oscillator defining a parameter of pulse trains of elementary pulses cyclically interrupted and controlled in accordance with the invention.

The second oscillator 6 for defining the duration Ton and cut-off time interval Toff of pulse trains A is associated with a control circuit 12 adapted to respond to the output signal of the comparator circuit 11 indicating change in the machining area, thereby controllingly changing Ton and/or Toff and, preferably Ton alone. FIG. 3 illustrates an example of the time-defining portion of the oscillator 6 which comprises a variable time-constant network 12A consisting of a resistor R and a plurality of capacitors C1, C2, C3, C4 and C5 of varying capacitances connected in parallel with one another and in series with the resistor R and in which a switch S1, S2, S3, S4, S5, preferably electronic, is inserted in each branch connecting each capacitor with the common resistor. The switches S1 to S4 are selectively closed in response to the output signal of the comparator 11 to selectively couple the capacitors C1, to C5 with the resistor R to establish corresponding time-constant networks. Control of pulse trains A is thus effected so as to decrease and increase the cut-off time interval Toff when the machining area is indicated increasing and decreasing, respectively, and, possibly also to correspondingly increase and decrease the duration Toff of pulse trains individually constituted of elementary pulses a of predetermined on-time $\tau$on and off-time $\tau$off.

The use of elementary pulses supplied cyclically with intervals and in trains or groups is capable with extreme ease of recurrently generating machining discharges. Desired machining conditions are readily established at will by presetting the pulse duration $\tau$on and interval $\tau$off accordingly. Thus, a given mode of electrical discharge machining is accomplished at a maximum stock removal and efficiency with a superior surface finish and preset minimum electrode wear by individual elementary pulses. Furthermore, control of individually adjusted machining pulses in train or group facilitates modification of machining current in accordance with change in the machining area, yet without affecting the established machining conditions and with stability of operation at a maximum machining efficiency.

Figure 4:
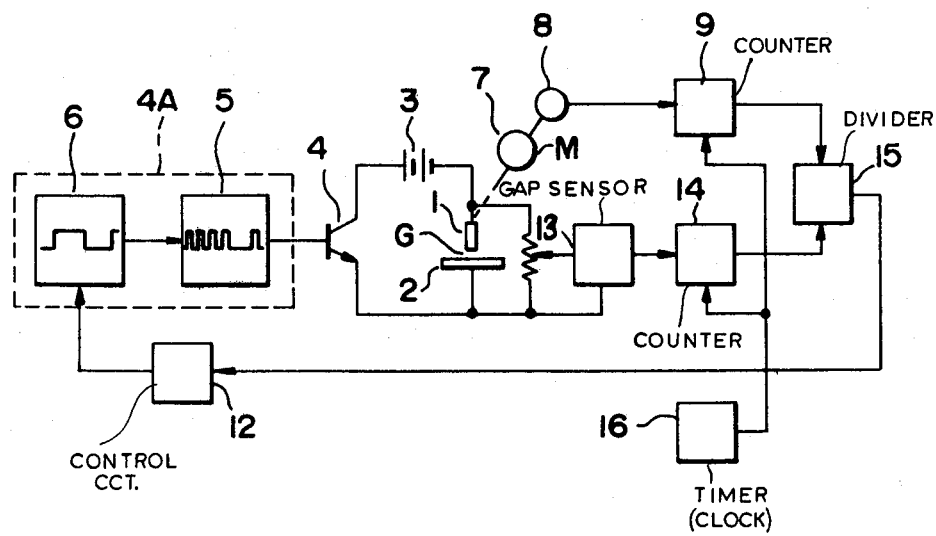
FIG. 4 is a diagrammatic circuit representation illustrating a practical system in accordance with the present invention.

In FIG. 4 there is shown a further embodiment of the present invention which includes a modified detection system. The detection system in this embodiment includes a gap sensor 13 connected to the machining gap G for classifying gap pulses in each controlled train or group into "satisfactory" and "unsatisfactory" pulses and a preset counter 14 for selectively counting "satisfactory" pulses. In this case, a gap pulse may be determined to be "satisfactory" unless it is sensed to result in an open-circuit or no-load pulse, arc-discharge or short-circuiting and if it results in a normal discharge accompanying stock removal. In this embodiment, a divider 15 is provided having two inputs, the first fed from the counter 9 described earlier which provides a pulse accumulation representing the distance of advance of the tool electrode 1 per unit time and the second fed from the counter 14 which provides a signal corresponding to an accumulation of "satisfactory" pulses for unit time. In order for the two counters 9 and 14 to be synchronized, a timer 16 is provided to apply a timing signal to the counters 9 and 14 so that the counting in each thereof is effected at a predetermined, synchronous time interval.

The divider 15 accordingly provides a signal representing removal rate divided by the rate of advance of the tool electrode 1 which equals the instantaneous machining area. If there is a change in the machining area detected, the control circuit 12 which may here be adapted to serve a threshold function responds to execute switch-over of the duration Ton and/or interval Toff of pulse trains as previously described.

Figure 5:
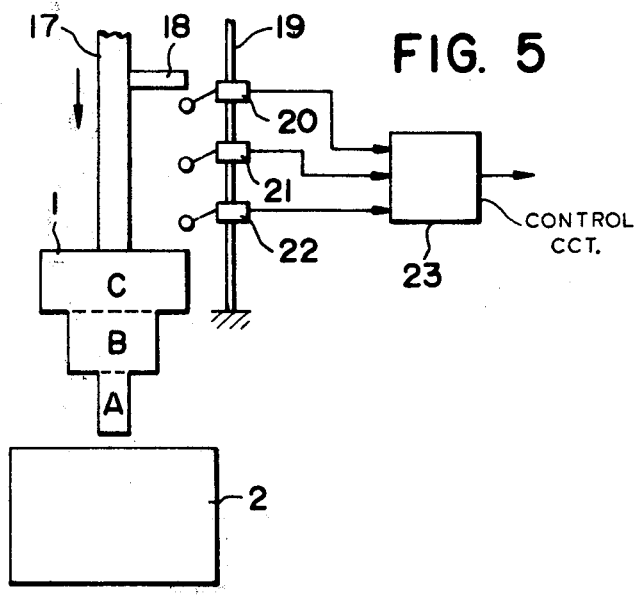
FIG. 5 is a diagrammatic illustration of another area detecting arrangement for carrying out the invention.

In FIG. 5 there is shown another embodiment of the system for detecting change in the machining area for practicing the present invention. This system is designed for use with a tool electrode 1 having a plurality of machining sections with areas A, B and C, respectively, which are progressively enlarged (A<B<C) and stepped in the tool feed or advance direction with each extending perpendicular to the latter. The system makes use of a movable spindle 17 securely supporting the tool electrode 1 and having a horizontal projection 18 attached thereto and a fixed shaft 19 extending in parallel with the spindle 17. On the shaft 19 there are mounted limit switches 20, 21 and 22 whose contacts are adapted to be successively closed in response to the engagement with the projection 18 as the electrode 1 is advanced to place in machining position the machining faces A, B and C, respectively, relative to the workpiece 2. In this arrangement, the closure of each limit switch 20, 21, 22 is responded to by a control circuit 23 having a function similar to the control circuit 12 to act on a time-determining section of the oscillator defining the duration Ton and/or interval Toff of pulse trains as already described in accordance with change in the machining area detected.

Figure 6:
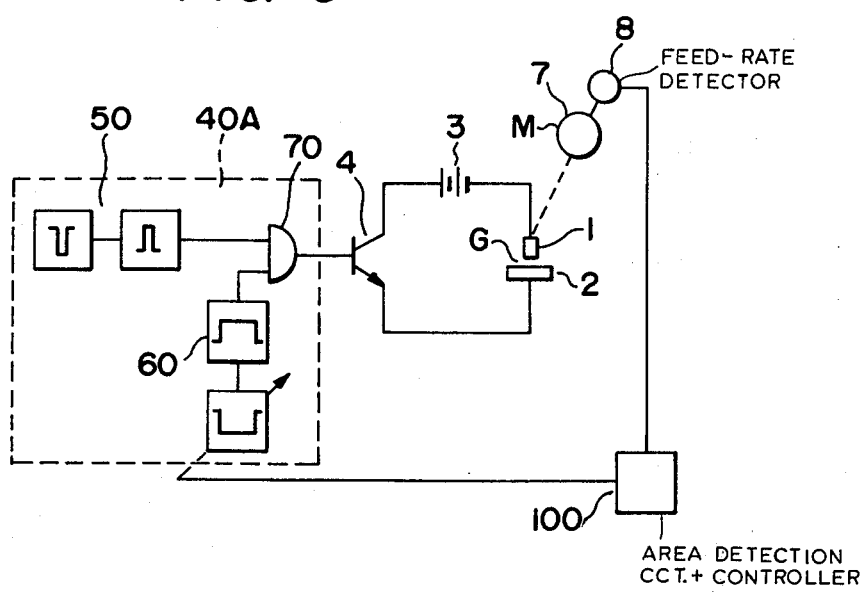
FIG. 6 and 7 are circuit diagrams showing a different pulse forming circuitry for use with the invention.
Figure 7:
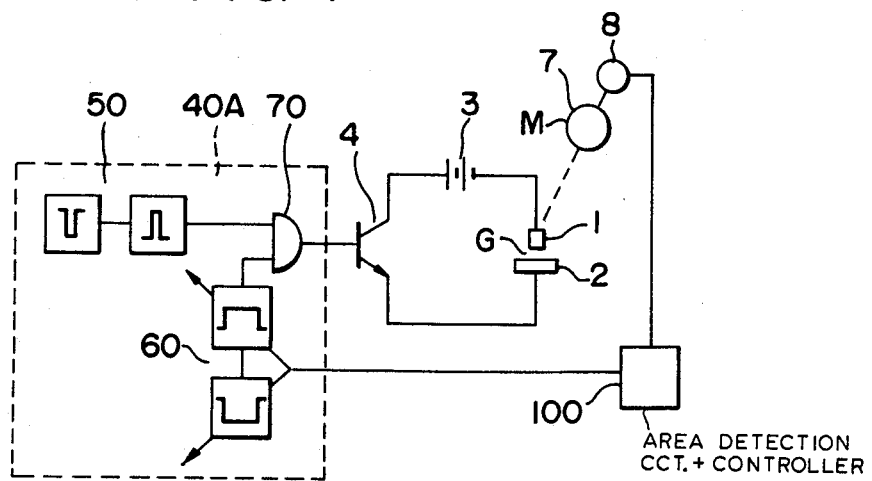

In the arrangements of FIGS. 6 and 7, the pulse forming unit 40A for operating the switch 4 comprises a first oscillator 50 (e.g., a multivibrator) operating to provide a series of elementary pulses of predetermined on-time $\tau$on and off-time $\tau$off and a second oscillator 60 (e.g., a multivibrator) operating to provide a series of pulses of duration Ton and interval Toff of which Toff alone is variable and Ton is substantially fixed (FIG. 6) or both of which are variable (FIG. 7), the outputs of the first and second oscillators being tied together at an AND gate 70 whose output is fed into the control elements of the power switch 4. As a result, pulse trains individually consisting of elementary pulses of $\tau$on and $\tau$off and having duration Ton with the successive trains being separated by interval Toff are impressed across the machining gap G as in the system described earlier. Here again, the rate of advance of the tool electrode 1 is shown sensed by the encoder 8 coupled with the motor 7 driving the electrode 1, the encoder 8 being fed into a unit 100 having the function and components (9, 10, 11; 13, 14, 15) as have been described to derive therefrom a signal representing the instantaneous machining area and a controller (12) thereby acting on the oscillator 60 to vary the duration Ton in which elementary pulses are permitted to be applied to the machining gap and/or the interval Toff during which the elementary pulses are interrupted so as to maintain the current density over the machining area and hence the rate of advance of the tool electrode relative to the workpiece substantially constant.

Alternatively, the oscillator 60 may be controlled, in response to a preset electrode position detector as shown and described in connection with FIG. 5 whose tool electrode 1 has a relatively simple shape in which such arrangement is applicable.

It should also be noted that the rate of advance of the tool electrodes relative to the workpiece may be detected by any other arrangement. Thus, for example, displacement of the tool electrode or a spindle or ram carrying the same may directly be detected by a magnetic, electromagnetic or optoelectrical scale having a reading head operatively mounted thereon and an encoder or coding unit for producing a signal pulse upon each incremental displacement of the tool electrode with the pulses for counting by an arrangement as described.

There is thus provided an improved EDM method and apparatus which allow machining on a full-automatic basis with an increased stability, efficiency and reliability.

What is claimed is:

1. A method of electrical-discharge machining of a workpiece juxtaposed with a tool electrode across a dielectric-filled machining gap with machining surfaces of variable area as the tool electrode is advanced relatively toward the workpiece so as to maintain the gap spacing therebetween substantially constant, the method comprising the steps of:

applying across said machining gap pulse trains individually consisting of elementary pulses of predetermined on-time $\tau$on and off-time $\tau$off, the pulse trains having a duration Ton constituting a first time element and the successive trains being separated by a cut-off interval Toff constituting a second time element;

sensing the instantaneous area of said machining surfaces during application of said pulse trains across said machining gap; and controlling at least one of said time elements in accordance with said sensed machining area so as to maintain the current density along said machining surfaces substantially constant in spite of change in said machining area during relative advance of said electrode.

2. The method defined in claim 1, wherein said duration Ton of each train is substantially fixed and said time Toff is varied in accordance with the sensed machining area.

3. The method defined in claim 1 or 2, wherein $\tau$on ranges between 1 microsecond and 3 milliseconds, $\tau$off ranges between 3 and 200 microseconds, and Ton and Toff each range between 200 microseconds and 5 milliseconds.

4. The method defined in claim 3, wherein $\tau$on and $\tau$off each range between 1 and 100 microseconds.

5. The method defined in claim 1 wherein said tool electrode has a plurality of machining sections with the respective machining faces stepped in the advance direction with each extending perpendicular thereto and said instantaneous machining area is sensed by detecting the position of said tool electrode corresponding to entry of each of said machining faces into machining relationship with said workpiece.

6. The method defined in claim 1 wherein the instantaneous machining area is sensed by detecting the rate of advance of said tool electrode relative to said workpiece during application of said pulse trains and said at least one of said time elements is controlled in accordance with said detected rate of relative advance of the tool electrode.

7. The method defined in claim 6, wherein said rate of relative advance of said electrode is detected by producing a series of pulses each in response to an incremental advance displacement of the tool electrode relative to the workpiece, determining the number of such incremental pulses in unit time and deriving a control signal therefrom as representative of said rate of relative advance for controlling said at least one of duration Ton and interval Toff of pulse trains.

8. The method defined in claim 7 wherein said number of incremental pulses is counted in an integrating counter whose accumulation level is compared with a reference signal to provide said control signal.

9. The method defined in claim 7, wherein said number of such incremental pulses in unit time is compared with the number of machining pulses effected across said machining gap to produce said output signal.

10. An apparatus for electrical-discharge-machining a workpiece electrode with a tool electrode across a dielectric-filled machining gap with machining surfaces of variable area as the tool electrode is advanced relatively toward the workpiece, comprising:
  power supply means for applying across said gap pulse trains individually consisting of elementary pulses of predetermined on-time $\tau$on and off-time $\tau$off and having a duration Ton with the successive trains being separated by a cut-off time interval Toff;
  means for sensing the instantaneous area of said machining surfaces to produce an output signal during application of said pulse trains across said machining gap; and
  means for controlling at least one of said duration Ton and interval Toff in accordance with said output signal so as to maintain the current density along said machining surfaces substantially constant in spite of change in said machining area during relative advance of said electrodes.

11. The apparatus defined in claim 10, wherein said tool electrode is securely carried by a spindle and said sensing means comprises a plurality of limit switches speedly mounted on a shaft extending in parallel with said spindle, said spindle having an attachment secured thereto for engagement with said limit switches indicating said instantaneous machining area.

12. The apparatus defined in claim 10, wherein one of said tool electrode and workpiece electrode is advanced relatively toward the other by servo feed means so as to maintain the gap spacing substantially constant and said sensing means comprises circuit means responsive to the rate of relative advance movement of said electrodes for producing said output signal representative of change in area of the machining gap during application of said pulse trains across said machining gap.

13. The apparatus defined in claim 12, wherein said circuit means comprises means for producing a series of pulses each representative of an incremental displacement of said tool electrode relative to said workpiece and a counter for accumulating said incremental pulses to produce an output representing the number of incremental pulses per unit time.

14. The apparatus defined in claim 13, wherein said circuit means further comprises means coupled with said machining gap for counting the number of machining discharge pulses effected across said machining gap per unit time to produce a second output and divider means for dividing said second output by said first output or vica versa to produce said output signal.

15. The apparatus defined in claim 14, wherein said counter is a reversible counter whose count level is subtracted by a pulse representing a backward incremental displacement of said tool electrode relative to said workpiece.

* * * * *